(12) United States Patent
Orlov

(10) Patent No.: US 12,735,169 B2
(45) Date of Patent: Sep. 15, 2026

(54) FUSELAGE FRAME

(71) Applicant: Airbus Operations GmbH, Hamburg (DE)

(72) Inventor: Dimitri Orlov, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 19/350,314

(22) Filed: Oct. 6, 2025

(65) Prior Publication Data

US 2026/0109446 A1 Apr. 23, 2026

(30) Foreign Application Priority Data

Oct. 17, 2024 (EP) .................................... 24207209

(51) Int. Cl.

| | |
|---|---|
| ***B64C 1/06*** | (2006.01) |
| ***B64C 3/00*** | (2006.01) |
| ***B64D 37/02*** | (2006.01) |
| ***B64F 5/10*** | (2017.01) |

(52) U.S. Cl.

CPC ................ *B64C 1/061* (2013.01); *B64C 3/00* (2013.01); *B64D 37/02* (2013.01); *B64F 5/10* (2017.01)

(58) Field of Classification Search

CPC ............ B64D 37/02; B64C 1/061; B64C 3/00

See application file for complete search history.

(56) References Cited

U.S. PATENT DOCUMENTS

2011/0052845 A1* 3/2011 Dermond ................ B29C 53/66 156/185
2017/0066520 A1* 3/2017 Soula ........................ B64C 3/22
2019/0351990 A1* 11/2019 Linde ...................... B64C 1/064
2019/0382096 A1* 12/2019 Martino-Gonzalez .... B64C 1/26
2020/0189713 A1* 6/2020 Murphy .................... B64C 1/26

FOREIGN PATENT DOCUMENTS

EP 3619109 B1 1/2022
GB 2268461 A 1/1994

OTHER PUBLICATIONS

European Search Report for corresponding European Patent Application No. 24207209.8 dated Mar. 24, 2025.

* cited by examiner

*Primary Examiner* — Tye William Abell

(74) *Attorney, Agent, or Firm* — Greer, Burns & Crain, Ltd.

(57) ABSTRACT

A frame for an aircraft fuselage including a primary frame segment and a secondary frame segment. The primary frame segment includes a primary arc with two primary end sections and includes a primary inner surface and a primary outer surface. The secondary frame segment includes a secondary arc with two secondary end sections and includes a secondary inner surface and a secondary outer surface. The primary frame segment and the secondary frame segment are configured to be couplable to each other such that their end sections partially overlap so that a portion of the secondary inner surface of the secondary end sections of the secondary frame segment abuts on a portion of the primary outer surface of the primary end sections of the primary frame segment, thereby forming transition areas from the primary frame segment to the secondary frame segment.

13 Claims, 5 Drawing Sheets

FUSELAGE FRAME

CROSS-REFERENCES TO RELATED APPLICATIONS

This application claims the benefit of European Patent Application Number 24207209.8 filed on Oct. 17, 2024, the entire disclosures of which are incorporated herein by way of reference.

FIELD OF THE INVENTION

The present invention relates to the fuselage structure of an aircraft, and in particular, to a frame for an aircraft fuselage, to a fuselage segment of an aircraft, to an aircraft and to a method for manufacturing a frame for an aircraft fuselage.

BACKGROUND OF THE INVENTION

The structural components of an aircraft fuselage commonly include circumferential frames, longitudinal stringers and a skin as the outer covering of the fuselage. The frames maintain the fuselage's cylindrical shape and provide strength and support. They are typically spaced at regular intervals along the length of the fuselage, help distribute loads and may also provide attachment points for other components or inner systems and structures such as a fuel tank.

However, among aircraft engineers, an ongoing interest exists in providing alternative designs of fuselage frames that feature technical and economic improvements.

SUMMARY OF THE INVENTION

There may thus be a need to provide an alternative fuselage frame with an enhanced structure.

It should be noted that the following described aspects of the invention apply also for the fuselage segment of an aircraft, for the aircraft and the method for manufacturing a frame for an aircraft fuselage.

According to the present invention, a frame for an aircraft fuselage is provided. The frame comprises a primary frame segment and a secondary frame segment. The primary frame segment provides a primary arc with two primary end sections, and comprises a primary inner surface and a primary outer surface. The secondary frame segment provides a secondary arc with two secondary end sections, and comprises a secondary inner surface and a secondary outer surface. The primary frame segment and the secondary frame segment are configured to be couplable to each other such that their end sections partially overlap so that a portion of the secondary inner surface of the secondary end sections of the secondary frame segment abuts on a portion of the primary outer surface of the primary end sections of the primary frame segment, thereby forming transition areas from the primary frame segment to the secondary frame segment.

As an effect, it is possible to install the fuselage frame partly outside the fuselage, preferably in areas covered by a fairing. In the case of a fuel tank located in the fuselage, this can also be the area around the fuel tank. Consequently, in-service inspections could be provided from outside of a fuel tank. Due to reduced space and accessibility restrictions the frame installation is simplified, and parts can also be used for installation of outside structures, such as crash elements. There are also improvements for stress and fatigue definition due to less limitations of section size and higher frame inertia due to bigger part radius.

The term "fuselage" refers to the main body of an aircraft.

A "frame" of an aircraft fuselage refers to a circular or oval-shaped structure that forms part of the structural skeleton that gives the fuselage its shape and strength. Several frames may be spaced at regular intervals along the length of an aircraft fuselage to maintain the generally circular or oval cross-sectional shape. A frame can be made of lightweight, high-strength materials like aluminum or composites. The term "frame" may also be referred to as aircraft structure or framework.

The term "primary frame segment" refers to a first section of the frame and can also be referred to as inner frame segment, inside frame segment, upper frame segment, inner frame, inside frame, upper frame or primary frame. The primary frame segment is a first part of the fuselage frame. It includes a "primary inner surface" (the surface facing the inside of the fuselage) and a "primary outer surface" (the surface facing the outside of the fuselage).

The term "secondary frame segment" refers to a second section of the frame and can also be referred to as outer frame segment, outside frame segment, lower frame segment, outer frame, outside frame, lower frame or secondary frame. The secondary frame segment is a second part of the fuselage frame. It includes a "secondary inner surface" (the surface facing the inside of the fuselage) and a "secondary outer surface" (the surface facing the outside of the fuselage). The term "inner surface" can also be referred to as internal surface and the term "outer surface" can also be referred to as external surface.

Both the primary and secondary frame segments provide an arc with two end sections that do not meet, forming a gap or opening. The term "arc" refers to a curved line and may be a portion of the circumference of a circle or an oval. It is defined by two endpoints on the circle or oval and the continuous curve between them.

The primary and secondary frame segments are configured to be couplable, i.e., able to be joined together and form a frame for an aircraft fuselage when assembled together.

In an example, the primary frame segment is configured to enclose, e.g., a cabin space within an aircraft fuselage.

In a further example, the secondary frame segment is configured to enclose, e.g., a cargo space and/or a space for a fuel tank within the aircraft fuselage.

When the two frame segments are coupled, the end sections of the primary frame segment partially overlap with the end sections of the secondary frame segment such that a portion of the secondary inner surface of the secondary frame segment abuts on a portion of the primary outer surface of the primary frame segment.

This overlapping creates "transition areas", which may be referred to as the regions where the two segments transition from one to the other, connecting the two parts of the fuselage frame.

According to an example, the primary frame segment and the secondary frame segment are configured to provide an interspace between them to clamp a fuselage skin between the overlapping portions of the primary frame segment and the secondary frame segment such that the fuselage skin is supported by the primary outer surface of the primary frame segment and by the secondary inner surface of the secondary frame segment.

As an advantage, one frame segment is outside the fuselage skin and thus, can, for example, be used as a crash element or for the installation of outside structures such as fairings or systems. Besides, the installation of additional protective elements inside, such as liners, is simplified because the outwardly positioned frame parts create a floor area inside the fuselage that is not interrupted by the frames. Liners can therefore be laid more easily and in larger dimensions.

The term "interspace" refers to a space or gap between the two frame segments and, in particular, between the primary outer surface of the primary frame segment and the secondary inner surface of the secondary frame segment.

The term "fuselage skin" refers to the outer layer of the aircraft fuselage, which provides the aerodynamic surface and contributes to the structural integrity of the aircraft. The "fuselage skin" may also be referred to as skin, outer shell, external covering, aircraft skin, fuselage exterior, surface layer, exterior paneling, outer casing or fuselage sheath. The fuselage skin has an inner surface and an outer surface, and can be made from thin sheets of metal (such as aluminum alloy) or composite materials.

The term "clamp" refers to holding the fuselage skin securely in place. The term also refers to squeezing the fuselage skin tightly between the outer and inner surfaces of the primary and secondary frame segments, respectively. Thus, the clamping ensures that the fuselage skin is securely attached to the frame.

The fuselage skin is positioned in such a way that it rests with its inner surface on the primary outer surface of the primary frame segment. This means the outer surface of the primary frame segment directly supports the fuselage skin from the inside. Simultaneously, the fuselage skin rests with its outer surface on the secondary inner surface of the secondary frame segment, which means the inner surface of the secondary frame segment also supports the fuselage skin from the outside.

According to an example, the primary arc has a greater arc length than the secondary arc and, preferably, forms an opening wherein tangents on the end sections of the primary arc intersect each other on a side of the opening.

The arc length of the primary arc (provided by the primary frame segment) and of the secondary arc (provided by the secondary frame segment), respectively, can however be adapted as required. In an example, the secondary arc is having a greater arc length than the primary arc.

If the open arc extends over less than 180°, tangents that are applied to the ends of the open arc will never intersect. However, if the open arc extends beyond 180°, the tangents applied to the end sections will intersect. The arc can be circular in shape but may include also other shapes such as an oval shape.

According to an example, at least one of the end sections of the primary frame segment and the secondary frame segment runs out at an end of the transition area.

As a result, the primary and secondary frame segments gradually shift from one to the other.

As explained above, the "transition area" is the region where the two segments, the primary and secondary frame segments, overlap. The "end of the transition area" is the point where the overlapping of the two segments finishes. Beyond this point, the structure resumes a uniform configuration without further overlap.

The term "run out" means that the material of the frame segment gradually tapers off or diminishes towards a thin edge as it reaches the end of the transition area. The term may also refer to slanting, sloping, tapering off or thinning out. The running out ensures that there are no abrupt changes or stress concentrations that could weaken the structure. In case there is no fairing covering the transition area(s), a smooth tapering off may also improve the aerodynamics of the fuselage by reducing the potential for drag or turbulence caused by abrupt changes in the surface.

As an example, the tapering or running out may occur with one or both end sections of the primary frame segment alone or with one or both end sections of the secondary frame segment alone or preferably, with both end sections of both the primary and secondary frame segments. In a preferred example, both end sections of the secondary frame segment run out at the end of the transition area.

According to an example, the frame further comprises fastener elements to connect the primary frame segment with the secondary frame segment in the transition area.

As an effect, the segments can be firmly attached to each other.

As described previously, the primary and secondary frame segments overlap in the transition area where the primary frame segment and the secondary frame segment can be coupled. It is possible that a weakness here compromises the entire structure. Fastener elements can reinforce this area, making the connection between the segments more robust and reliable.

The term "fastener element" refers to components used to mechanically join or secure two or more parts together. A fastener element may also be referred to as fastening element and comprises, inter alia, rivets, bolts or nuts.

In an example, the fastener elements pass or pierce through the fuselage skin which may be clamped between the primary frame segment and the secondary frame segment.

As an option, the primary frame segment and the secondary frame segment are connected with each other in the transition area by a bonded or glued connection or by any other means capable of holding the two segments together. Thus, the term "fastener element" also refers to glue, adhesive or any other material that is suitable for connecting the two segments.

According to an example, the primary frame segment is connected with or forms part of an inner structure of the aircraft, such as, for example, a fuel tank.

The term "inner structure" of the aircraft refers to any of the various components and systems which may be located inside the fuselage. These can include, for example, fuel tanks, cargo holds, avionics compartments, and other structural or functional parts of the aircraft. The term "inner structure" may also be referred to as inner component or inner structural component.

In an example, the primary frame segment may be "connected with" an inner structure, i.e., the primary frame segment may be physically attached or fastened to an inner structure like a fuel tank. This connection can provide additional support and stability to both the frame and the inner structure.

In another example, the primary frame segment can "form part of" an inner structure, i.e., the primary frame segment may constitute a part of the inner structure itself. For example, the frame segment might be configured to serve as a structural wall or support for a fuel tank, integrating its function into the frame.

According to an example, a yoke-shaped support structure is connected with the end sections of the primary frame segment.

The term "yoke-shaped" refers to something that resembles the shape of a yoke or has a form that mimics the curved or U-shaped design of a traditional yoke.

In an example, the support structure is configured to carry a fuel tank.

In an example, the support structure is configured to support a cabin floor.

According to an example, the secondary frame segment is covered by a fairing.

As an effect, the shape and size of the secondary frame segment as an external part of the frame does not have to be based on aerodynamic considerations. It is also possible for this secondary frame segment to be connected to the fairing.

The term "fairing" relates to a structure used to cover joints, gaps, or protruding parts that would otherwise create turbulence or increase drag. There can be a fairing in any area around the fuselage. The "fairing" may also be referred to as a belly fairing if it is located in the lower body area, the belly area, so to speak.

According to the present invention, also a fuselage segment of an aircraft is provided. The fuselage segment comprises a plurality of frames, a plurality of stringers and an outer skin. The frames and stringers are connected with each other and the outer skin is supported by the frames and stringers, wherein at least a part of the frames of the plurality of frames is provided as a frame as explained above, and wherein at least a part of the outer skin is arranged in the overlapping end sections of the primary and secondary frame segments.

The term "fuselage segment" refers to a part or a section of the fuselage of an aircraft, which fuselage can be built in segments that are later joined together during assembly. Each fuselage segment is made up of various structural elements, including frames such as the frames as explained above.

The term "stringer" refers to a long, structural element that runs longitudinally along the fuselage, connecting the frames. Stringers help maintain the shape of the fuselage and provide additional strength and rigidity, especially against bending forces.

According to an example, in the region of the secondary frame segment(s) of the fuselage segment, the outer skin is arranged to be mounted to the secondary inner surface of the secondary frame segment(s).

In another example, in the region of the primary frame segment(s) of the fuselage segment, the outer skin is arranged to be mounted to the primary outer surface of the primary frame segment.

According to the present invention, an aircraft is provided. The aircraft comprises a wing structure, an empennage, and a fuselage, wherein the wing structure and the empennage are mounted to the fuselage, and wherein the fuselage comprises at least one frame and/or at least one fuselage segment as explained above.

The "wings" refer to the primary lift-generating surfaces that enable the aircraft to fly.

The term "empennage" refers to the rear part of an aircraft's structure that provides stability and control during flight. It typically includes the horizontal and vertical stabilizers, as well as the associated control surfaces. The "empennage" can also be referred to as the tail assembly or tail section.

According to the present invention, also a method for manufacturing a frame for an aircraft fuselage is provided. The method comprises the following steps:

Providing a primary frame segment and a secondary frame segment.

Coupling the primary frame segment to the secondary frame segment such that their end sections partially overlap so that a portion of the primary outer surface of the primary frame segment abuts on a portion of the secondary inner surface of the secondary frame segment, to form the fuselage frame.

According to an example, the method further comprises the steps:

Providing a fuselage skin and, before coupling the primary frame segment to the secondary frame segment, clamping the fuselage skin between them such that the fuselage skin is supported by the primary outer surface of the primary frame segment and by the secondary inner surface of the secondary frame segment, respectively.

According to an aspect, a frame for an aircraft fuselage is no longer provided as a single part, but is made up of two parts. The two parts are curved or arched segments and are configured to overlap at their end sections so that a skin of the aircraft fuselage can be clamped between them. As a result, one part (preferred but not necessarily the upper part) of the frame is "inside" the fuselage skin and one part (preferred but not necessarily the lower part) is "outside" the fuselage skin. This leads to several advantages, as the outer part of the frame can be used in different ways, for example as a crash element, as a connection to the fairing or other outside structures. On the inside of the fuselage, a smooth floor surface is created that is not interrupted by frame sections, so that liners can be installed much more easily and in other dimensions. By allowing the lower frame section to be removed like a "lid", accessibility for repairs is improved and any fuel tanks, for example, can be easily serviced from the outside. A further advantageous effect is the reduction of parts as a multifunctional usage of frame portions is conceivable. Moreover, a weight reduction is achieved due to higher inertia of the frames and elimination of additional crash parts.

It is also conceivable that the upper segment is outside the fuselage skin and the lower segment is inside the fuselage skin, such that the fuselage skin is supported by the primary inner surface of the primary frame segment and by the secondary outer surface of the secondary frame segment.

These and other aspects of the present invention will become apparent from and be elucidated with reference to the embodiments described hereinafter.

BRIEF DESCRIPTION OF THE DRAWINGS

Exemplary embodiments of the invention will be described hereinafter with reference to the following drawings.

DETAILED DESCRIPTION OF THE PREFERRED EMBODIMENTS

Figure 1:
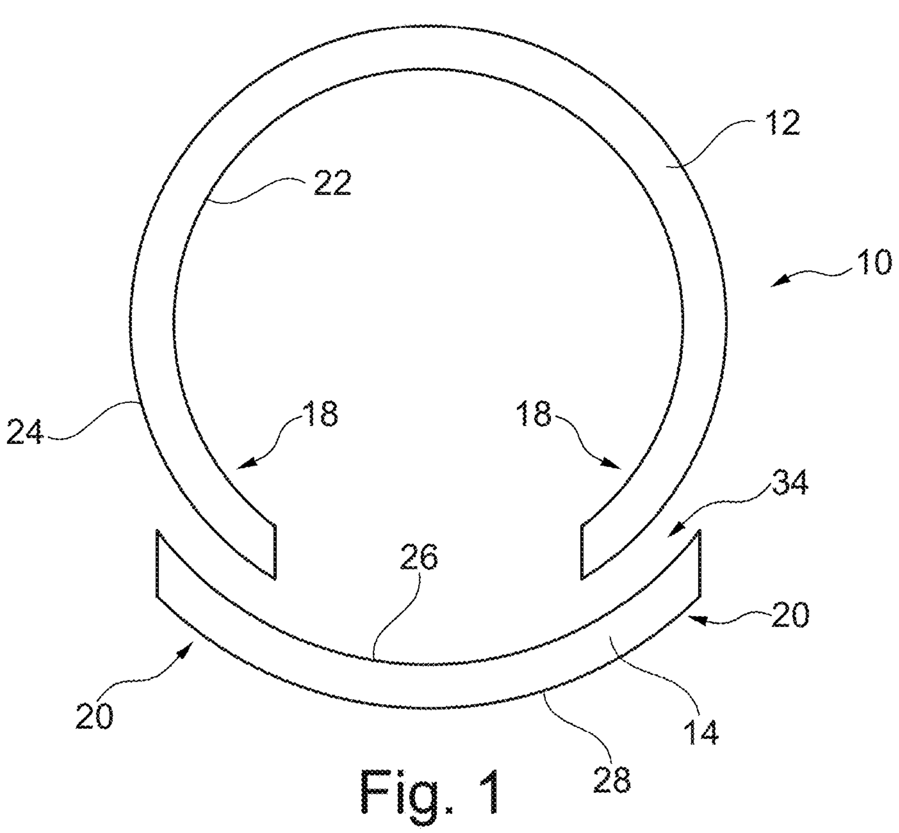
FIG. 1 schematically shows an example of a frame for an aircraft fuselage.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as “at least one of”, when preceding a list of elements, modify the entire list of elements and do not modify the individual elements of the list.

FIG. 1 schematically shows an example of a frame 10 for an aircraft fuselage. The frame 10 comprises a primary frame segment 12 providing a primary arc with a primary inner surface 22 and a primary outer surface 24 and primary end sections 18. The frame further comprises a secondary frame segment 14 providing a secondary arc with a secondary inner surface 26 and a secondary outer surface 28 and secondary end sections 20. The primary arc has a greater arc length than the secondary arc, and the primary arc forms an opening wherein imaginary (not shown) tangents on the primary end sections 18 intersect each other on the side of the opening. The primary frame segment 12 and the secondary frame segment 14 are configured to provide an interspace 34 between them. The primary frame segment 12 and the secondary frame segment 14 are arranged such that their end sections 20 and 18, respectively, overlap when the two segments are assembled together.

Figure 2:
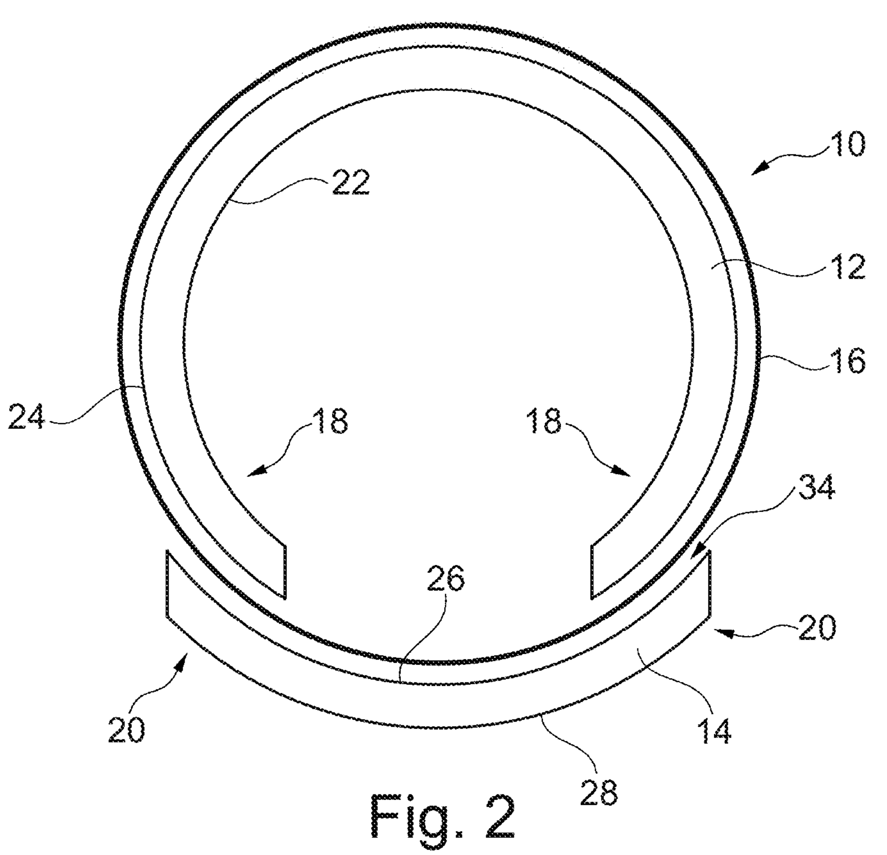
FIG. 2 schematically shows the example of a frame for an aircraft fuselage of FIG. 1 together with a fuselage skin.

FIG. 2 schematically shows the example of a frame 10 for an aircraft fuselage of FIG. 1 together with a fuselage skin 16. The fuselage skin 16 surrounds the primary frame segment 12 so that it rests on the primary outer surface 24 of the primary frame segment 12. The primary frame segment 12 and the secondary frame segment 14 are configured to provide an interspace 34 between them to clamp the fuselage skin 16 between the overlapping portions of the primary end sections 18 of the primary frame segment 12 and the secondary end sections 20 of the secondary frame segment 14. In the lower section of this illustration the fuselage skin 16 extends along the secondary inner surface 26 of the secondary frame segment 14 and in the upper section it extends along the primary outer surface 24 of the primary frame segment 12. Thus, the fuselage skin 16 is supported by the primary outer surface 24 of the primary frame segment 12 and by the secondary inner surface 26 of the secondary frame segment 14.

Figure 3:
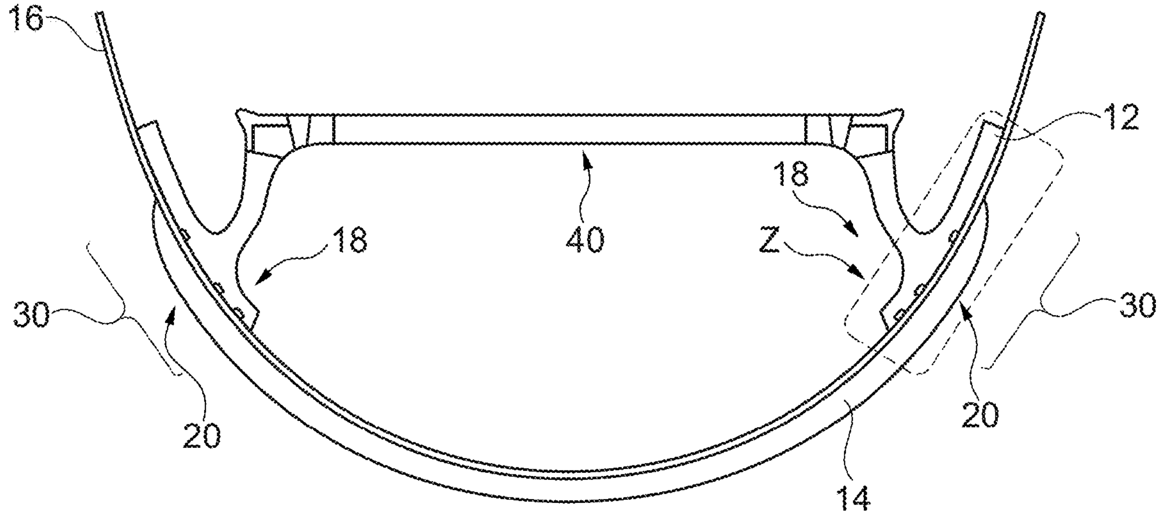
FIG. 3 shows a cross-sectional view of a part of an example of a frame for an aircraft fuselage.

In FIG. 3 a cross-sectional view of a part of an example of a frame 10 for an aircraft fuselage is shown. The primary frame segment 12 and the secondary frame segment 14 are coupled to each other such that their end sections 18, 20 partially overlap so that a portion of the secondary inner surface 26 of the secondary frame segment 14 abuts on a portion of the primary outer surface 24 of the primary frame segment 12, thereby forming a transition area 30. The fuselage skin 16 is clamped between the overlapping portions of the end sections 18, 20 of the primary and secondary frame segments 12, 14. In this example the primary frame segment 12 forms part of an inner structure of the aircraft, for example a fuel tank (not shown). A yoke-shaped support structure 40 is connected with the primary end sections 18 of the primary frame segment 12. The dashed lines mark a detail Z which can be seen enlarged in FIG. 4.

Figure 4:
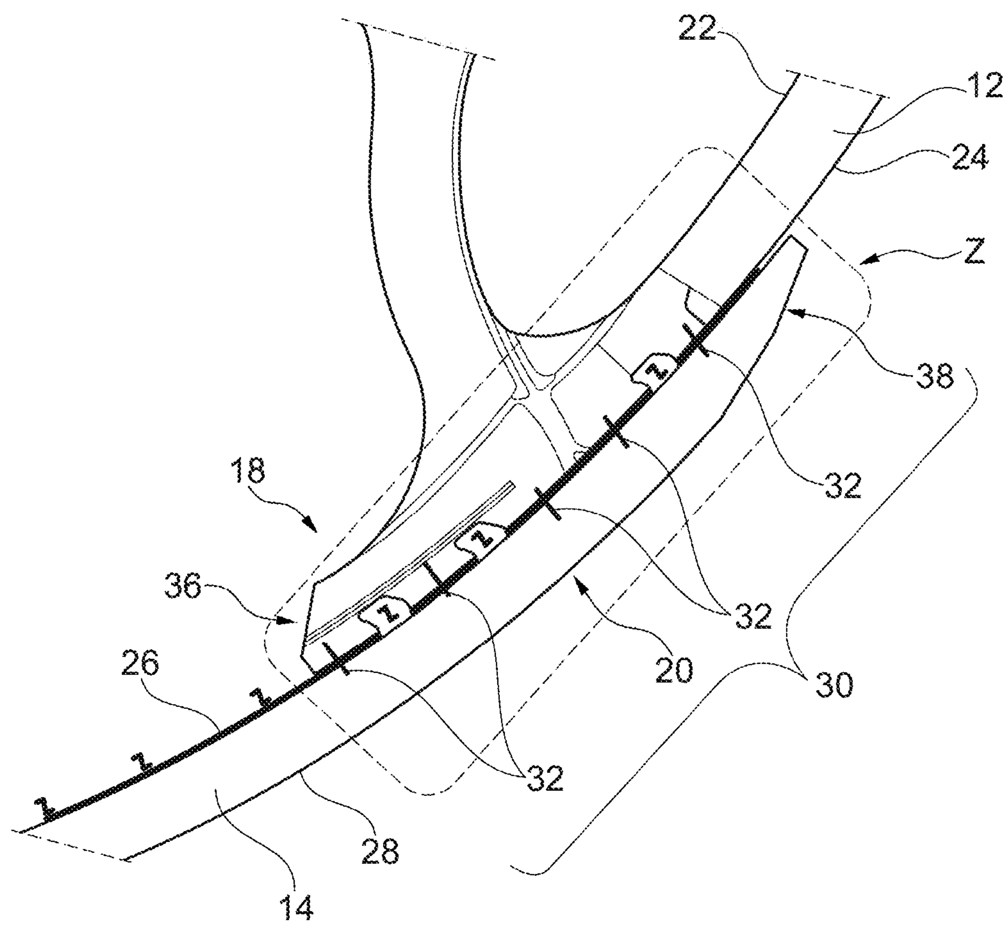
FIG. 4 shows an enlarged view of detail Z of FIG. 3.

FIG. 4 shows an enlarged view of detail Z of FIG. 3. It can be seen that the primary frame segment 12 and the secondary frame segment 14 are coupled to each other such that their end sections 18, 20 partially overlap and a portion of the secondary inner surface 26 of the secondary frame segment 14 abuts on a portion of the primary outer surface 24 of the primary frame segment 12. Both end sections 18, 20 of the primary frame segment 12 and the secondary frame segment 14 run out (36, 38) at the end of the transition area 30. Fastener elements 32 are used to connect the primary frame segment 12 with the secondary frame segment 14.

Figure 5:
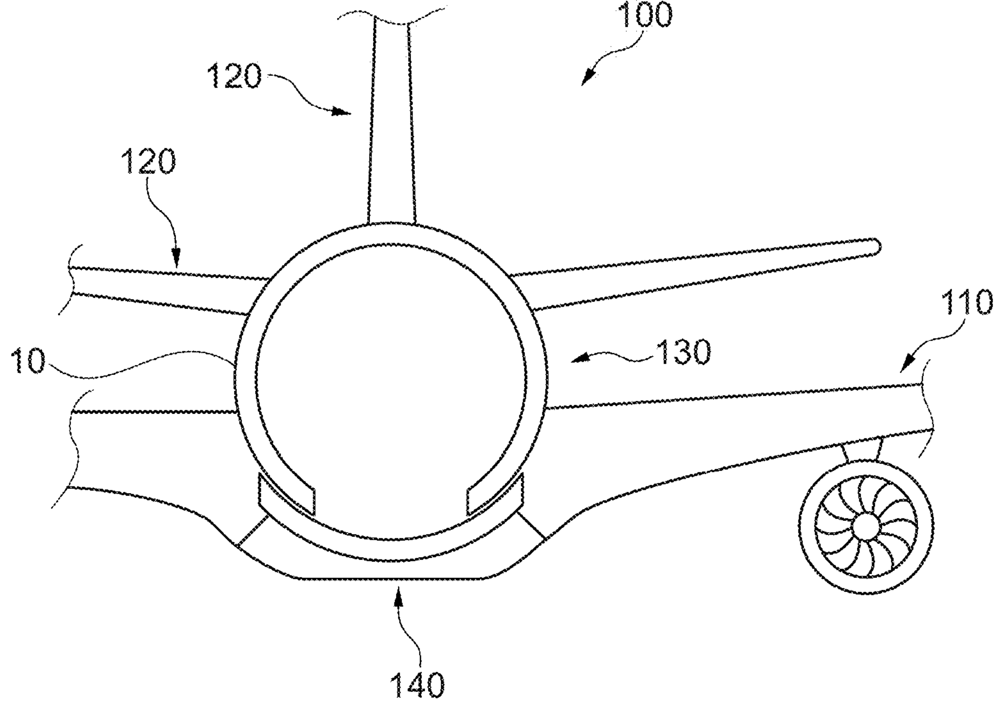
FIG. 5 shows a cross-section of an example of an aircraft with a fuselage frame.

FIG. 5 shows a cross section of an example of an aircraft 100 with a fuselage frame 10. The aircraft 100 comprises a wing structure 110 and an empennage 120, both of which are mounted to the aircraft fuselage 130. The secondary frame segment of the frame 10 is covered by a belly fairing 140.

Figure 6:
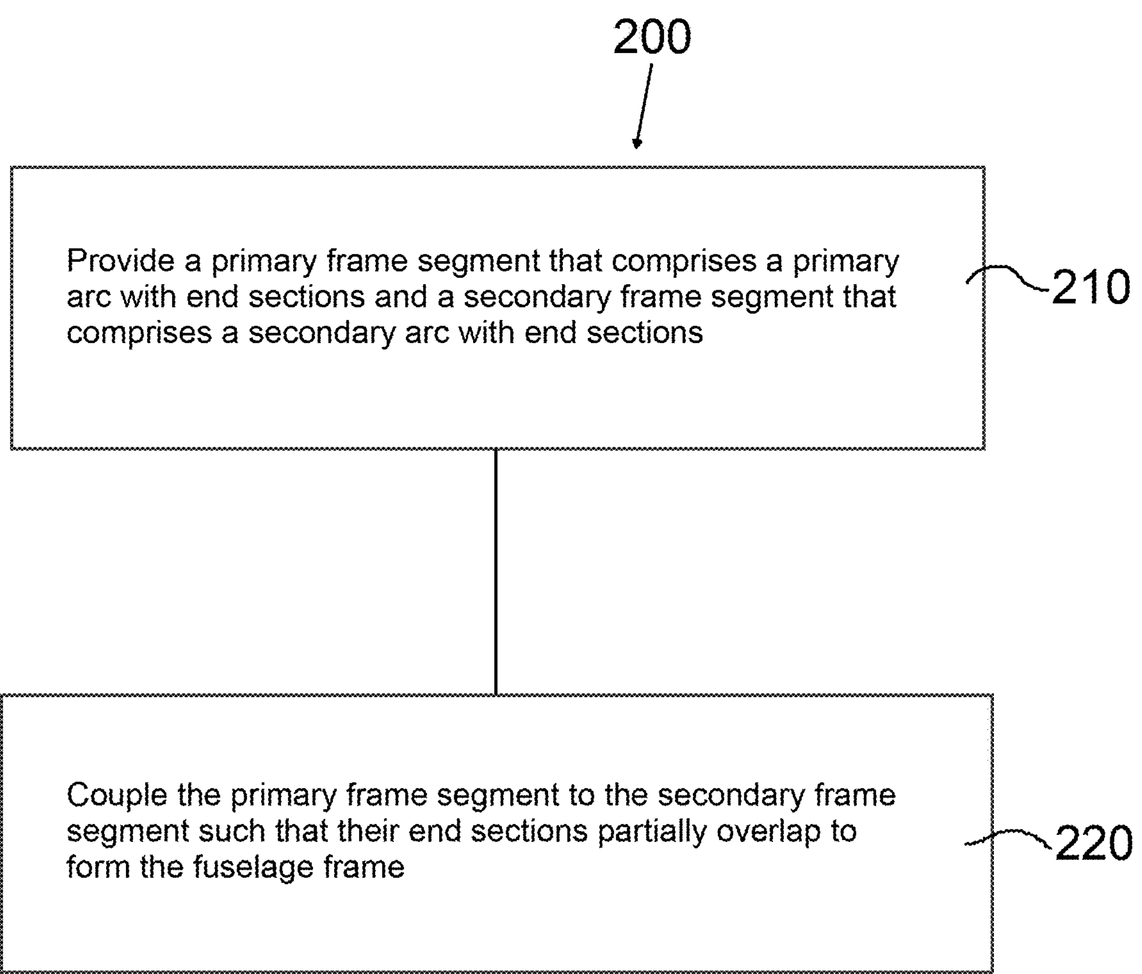
FIG. 6 shows basic steps of an example of a method for manufacturing a frame for an aircraft fuselage.

FIG. 6 shows basic steps of an example of a method 200 for manufacturing a frame for an aircraft fuselage. The method 200 comprises the following steps:

In a first step 210 a primary frame segment and a secondary frame segment is provided.

In a second step 220 the primary frame segment is coupled to the secondary frame segment such that their end sections partially overlap so that a portion of the primary outer surface of the primary frame segment abuts on a portion of the secondary inner surface of the secondary frame segment to form the fuselage frame.

As an option, the method 200 further comprises the following steps:

A step of providing a fuselage skin and, before the step of coupling the primary frame segment to the secondary frame segment, a step of clamping the fuselage skin between the primary frame segment and the secondary frame segment such that the fuselage skin is supported by the primary outer surface of the primary frame segment and by the secondary inner surface of the secondary frame segment.

It is noted that the terms first, second, etc. do not mean any priority or sequence in use or any other restriction.

It has to be noted that embodiments of the invention are described with reference to different subject matters. In particular, some embodiments are described with reference to method type claims whereas other embodiments are described with reference to device type claims. However, a person skilled in the art will gather from the above that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

10 frame
12 primary frame segment
14 secondary frame segment
16 fuselage skin
18 primary end section
20 secondary end section
22 primary inner surface
24 primary outer surface
26 secondary inner surface
28 secondary outer surface
30 transition area
32 fastener element
34 interspace
36 run out of primary frame segment
38 run out of secondary frame segment
40 yoke-shaped support structure
Z detail
100 aircraft
110 wing structure
120 empennage
130 fuselage
140 fairing
200 method

The invention claimed is:

1. A frame for a fuselage of an aircraft, the frame comprising:

a primary frame segment; and a secondary frame segment;

wherein the primary frame segment comprises a primary arc with two primary end sections, and comprises a primary inner surface and a primary outer surface;

wherein the secondary frame segment comprises a secondary arc with two secondary end sections, and comprises a secondary inner surface and a secondary outer surface;

wherein the primary frame segment and the secondary frame segment are configured to be couplable to each other such that their end sections partially overlap so that a portion of the secondary inner surface of the secondary end sections of the secondary frame segment abuts on a portion of the primary outer surface of the primary end sections of the primary frame segment, thereby forming transition areas from the primary frame segment to the secondary frame segment;

wherein the primary frame segment and the secondary frame segment provide an interspace between them to clamp a fuselage skin between the overlapping portions of the primary frame segment and the secondary frame segment such that the fuselage skin is supported by the primary outer surface of the primary frame segment and by the secondary inner surface of the secondary frame segment.

2. The frame according to claim 1, wherein the primary arc has a greater arc length than the secondary arc; and wherein the primary arc forms an opening;

wherein tangents on end sections of the primary arc intersect each other on a side of the opening.

3. The frame according to claim 1, wherein at least one of the end sections of the primary frame segment and the secondary frame segment runs out at an end of one of the transition areas.

4. The frame according to claim 1, wherein the frame further comprises fastener elements to connect the primary frame segment with the secondary frame segment in the transition areas.

5. The frame according to claim 1, wherein the primary frame segment is connected with or forms part of an inner structure of the aircraft.

6. The frame according to claim 5, wherein the inner structure of the aircraft comprises a fuel tank.

7. The frame according to claim 1, wherein a yoke-shaped support structure is connected with end sections of the primary frame segment.

8. The frame according to claim 1, wherein the secondary frame segment is covered by a fairing.

9. A fuselage segment of an aircraft, comprising:

a plurality of frames;

a plurality of stringers; and an outer skin;

wherein the frames and stringers are connected with each other;

wherein the outer skin is supported by the frames and stringers;

wherein at least some of the frames of the plurality of frames comprise a frame according to claim 1; and wherein at least a part of the outer skin is arranged in overlapping end sections of the primary and secondary frame segments.

10. The fuselage segment according to claim 9, wherein in a region of the secondary frame segment, the outer skin is configured to be mounted to the secondary inner surface of the secondary frame segment.

11. An aircraft comprising:

a wing structure;

an empennage; and a fuselage;

wherein the wing structure and the empennage are mounted to the fuselage; and wherein the fuselage comprises at least one frame according to claim 1.

12. An aircraft comprising:

a wing structure;

an empennage; and a fuselage;

wherein the wing structure and the empennage are mounted to the fuselage; and wherein the fuselage comprises at least one fuselage segment according to claim 9.

13. A method for manufacturing a frame for an aircraft fuselage, comprising the following steps:

providing a primary frame segment wherein the primary frame segment comprises a primary arc with two primary end sections, and comprises a primary inner surface and a primary outer surface;

providing a secondary frame segment wherein the secondary frame segment comprises a secondary arc with two secondary end sections, and comprises a secondary inner surface and a secondary outer surface;

coupling the primary frame segment to the secondary frame segment such that their end sections partially overlap so that a portion of the primary outer surface of the primary frame segment abuts on a portion of the secondary inner surface of the secondary frame segment, to form a fuselage frame; and providing a fuselage skin and, before coupling the primary frame segment to the secondary frame segment, clamping the fuselage skin between them such that the fuselage skin is supported by the primary outer surface of the primary frame segment and by the secondary inner surface of the secondary frame segment, respectively.

* * * * *